Figure 1:
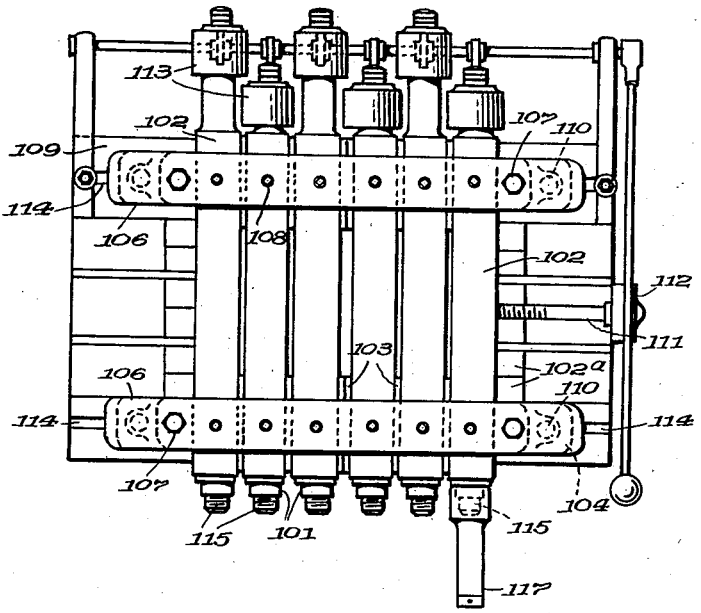

Sept. 14, 1937.　　　　F. WALTHER　　　　2,093,343

MULTIPLE SPINDLE DRILLING MACHINE

Original Filed Nov. 8, 1934

Inventor:
Fritz Walther
By Emil Bömelyke
Attorney

Patented Sept. 14, 1937

2,093,343

UNITED STATES PATENT OFFICE 2,093,343

MULTIPLE SPINDLE DRILLING MACHINE

Fritz Walther, Plauen in Vogtland, Germany, assignor to Vomag-Betriebs-A. G., Plauen in Vogtland, Germany Original application November 8, 1934, Serial No. 752,131. Divided and this application April 1, 1936, Serial No. 72,184. In Germany April 21, 1934

1 Claim. (Cl. 77—22)

This invention relates to boring and drilling machines, the present application being a division of applicant's copending application Ser. No. 752,131, filed November 8th, 1934; now Patent No. 2,080,643.

It is already known to arrange the spindle housings of multiple spindle drilling machines on the machine frame so that they are separately adjustable, and it is also known to connect a plurality of spindle housings rigidly with a plate and to adjust this plate as a whole relatively to the machine frame.

The object of the present invention is to provide a similar adjustability of the spindles on drilling machines serving for finest work and in which the adjusting and the locking of the spindle housings in the respective adjusted positions must be made with a higher exactness. In order to attain this result according to the present invention the spindle housings are joined with each other after interchangeable distance pieces adapted to adjust the space between the spindle axis have been interposed between them. Preferably the spindle housings are pressed against each other by clamping means, as fully described in the following specification.

The drawing shows by way of example an embodiment of the invention,

Figure 1 being a front view of the upper portion of a drilling machine and

Figure 2:
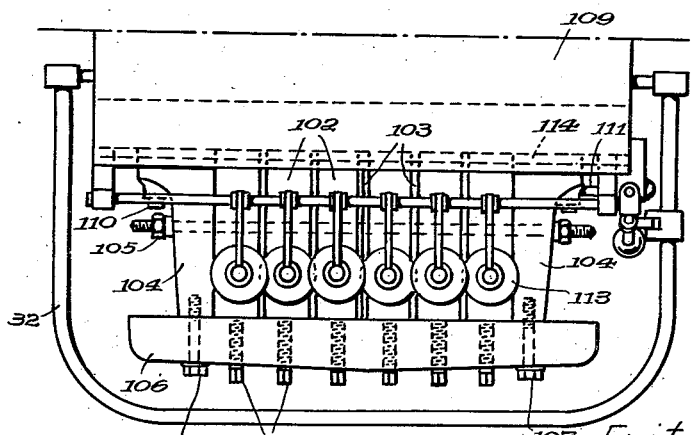

Figure 2 being a plan of same.

In the embodiment shown in the drawing a drilling machine is illustrated having six boring spindles, for instance designed for boring blocks containing six cylinders.

The individual spindles 101 are carried in bearings housed in bodies in the form of blocks 102, which are rectangular in plan. Each of these blocks is guided on the machine frame by means of a bar 102a which can be individually adjusted transversely of the machine. The distance between the individual blocks is determined by the thickness of interchangeable distance pieces 103, the arrangement being such that the distances between the various boring spindles may be adjusted for any requirement. The blocks 102 by being arranged in juxtaposition form a spindle unit, which is disposed between members 104 between which are secured adjustable tie-bars 105, as shown in Fig. 2.

At the front of the spindle unit, transverse members 106 are provided, which extend across the whole unit and are connected to the members 104 by means of screws 107 (Figs. 1 and 2). Through the members 106 are passed screws 108 by which the individual blocks 102 are firmly pressed against the body 109 arranged on the machine frame. The whole unit, composed of spindles, bearings, blocks 102, members 104, 106, is maintained on the body 109 by screws 110, (Figs. 1 and 2), but in such a manner that the whole unit can be displaced laterally. For this purpose, the screws 110 are made to engage in slots 114 in the body 109. A screw-threaded spindle 111 carried by a bracket 112 serves for displacing the whole unit. The drive of the individual spindles is effected in the example shown, by means of pulleys 113 arranged in staggered formation in regard to height, two driving belts being employed, each of which serves for three spindles and both of which belts can be driven from a common drive pulley.

The spindle noses 115 projecting below from the spindle bearings are provided with a thread on to which is screwed the boring rod.

Instead of the individual blocks 102 being square they can be cylindrical, or even octagonal or the like in plan, the distance pieces 103 being so shaped that they fit well on to adjacent blocks.

Obviously the machine may be provided with any other number of spindles than in the examples above described.

Further, it is also possible, in very large machines, to arrange spindles in sets, that is to say, to assemble, say sets of three or four spindles into one unit and to provide several such units on the same machine.

It is further possible to design on different constructional lines the means for clamping together the blocks 102 or for setting the latter in their correct position, that is to say, instead of employing a screw-threaded spindle such as 111, suitable rack and pinion mechanism may be provided for this purpose.

I claim:—

In a multiple spindle drilling machine, a frame, a plurality of axially stationary but transversely adjustable spindle housings provided with plane abutting faces, and means for securing said housings on the frame with predetermined spacing of their spindle axes and as a substantially solid block, said means comprising end brackets on the frame between which said housings and distance pieces are fitted, clamping means for drawing said brackets towards each other, clamping brackets at both the top and bottom ends of the housings, interchangeable flat distance pieces between the housings in the same horizontal planes, and means for shifting said brackets and the spindle housing block clamped between them transversely as a unit in said frame.

FRITZ WALTHER.